US008315625B2

(12) United States Patent
Kim et al.

(10) Patent No.: US 8,315,625 B2
(45) Date of Patent: Nov. 20, 2012

(54) APPARATUS AND METHOD FOR SELECTING MOBILE COMMUNICATION SYSTEM IN A PORTABLE TERMINAL

(75) Inventors: Byeong-Woo Kim, Suwon-si (KR); Chul-Hwan Lee, Seoul (KR); Jae-Kyun Kim, Seoul (KR)

(73) Assignee: Samsung Electronics Co., Ltd

( * ) Notice: Subject to any disclaimer, the term of this patent is extended or adjusted under 35 U.S.C. 154(b) by 1116 days.

(21) Appl. No.: 12/182,647

(22) Filed: Jul. 30, 2008

(65) Prior Publication Data

US 2009/0036120 A1 Feb. 5, 2009

(30) Foreign Application Priority Data

Jul. 30, 2007 (KR) ........................ 10-2007-0076325

(51) Int. Cl.
*H04W 4/00* (2009.01)
*H04B 1/38* (2006.01)
*H04M 1/00* (2006.01)

(52) U.S. Cl. ................... 455/432.1; 455/574; 455/552.1

(58) Field of Classification Search ............... 455/426.1, 455/432.1, 434, 552.1, 574
See application file for complete search history.

(56) References Cited

U.S. PATENT DOCUMENTS 6,400,961 B1 6/2002 Lillie et al.

FOREIGN PATENT DOCUMENTS

| | | |
|---|---|---|
| EP | 1 681 892 | 7/2006 |
| WO | WO 98/10617 | 3/1998 |
| WO | WO 01/05174 | 1/2001 |

*Primary Examiner* — Wesley Kim
(74) *Attorney, Agent, or Firm* — The Farrell Law Firm, P.C.

(57) ABSTRACT

A mobile communication system selection is disclosed. A method for selecting a mobile communication system of a portable terminal includes driving a first timer; checking whether a Mobile Country Code (MCC) of a region where the portable terminal is located is obtained by searching for a network until the first timer expires; when the MCC is obtained before the first timer expires, storing the obtained MCC to a previous MCC list; performing a first checking operation for checking whether the obtained MCC belongs to a list of countries supporting only a first mobile communication system; and obtaining a service of the first mobile communication system by searching for only the first mobile communication system when the obtained MCC belongs to the list of the countries supporting only the first mobile communication system.

14 Claims, 5 Drawing Sheets

START
BOOT TERMINAL UP ~110
DRIVE FIRST TIMER ~115
MCC CHECKER
SEARCH NETWORK ~120
125 ACQUIRE MCC? NO
135 FIRST TIMER EXPIRES? NO
YES
3
YES 130
STORE MCC TO 'PREVIOUS MCC LIST'
140 PREVIOUS MCC LIST INCLUDES MCC? NO
YES 145
COPY MCC FROM 'PREVIOUS MCC LIST'
150 'LIST OF COUNTRIES SUPPORTING ONLY WCDMA' INCLUDES MCC? NO
2
YES
1

APPARATUS AND METHOD FOR SELECTING MOBILE COMMUNICATION SYSTEM IN A PORTABLE TERMINAL

PRIORITY

This application claims the priority under 35 U.S.C. §119 (a) to a Korean patent application filed in the Korean Intellectual Property Office on Jul. 30, 2007 and assigned Serial No. 2007-76325, the entire disclosure of which is hereby incorporated by reference.

BACKGROUND OF THE INVENTION

1. Field of the Invention

The present invention relates generally to an apparatus and method for selecting a network in a portable terminal which supports both of a Global System for Mobile telecommunication (GSM) and a Wideband Code Division Multiple Access (WCDMA). More particularly, the present invention relates to an apparatus and method for selecting a mobile communication system optimized in a country which only provides the WCDMA service, to address the problems of high power consumption and long service acquisition time, resulting from repeated searches by a mobile terminal running an auto mode change algorithm for the GSM and the WCDMA when a portable terminal travels within a country which provides only the WCDMA service, such as Japan and South Korea, or when the portable terminal moves from Europe or North America, which provides GSM service, where the GSM is serviced to Japan or South Korea.

2. Description of the Related Art

When a network selection mode is set to an auto selection mode, a present-day portable terminal supporting both of a Global System for Mobile telecommunication (GSM) and a Wideband Code Division Multiple Access (WCDMA) repeatedly searches for the GSM service and the WCDMA service until it obtains a service. This happens even when the mobile terminal is in a country that does not provide the GSM service. In this situation, unnecessary power is consumed and a service acquisition time is drastically delayed.

In a “No service” or “Limited service” region, the portable terminal continues searching for the GSM mode and the WCDMA mode until it obtains the service. As a result, the portable terminal continues to search for the two modes until it moves into a service area, which considerably increases power consumption.

Particularly, when a WCDMA portable terminal travels to an area where only provides GSM, the portable terminal cannot acquire service and continues to search for the WCDMA network. This search causes serious power consumption.

SUMMARY OF THE INVENTION

An aspect of the present invention is to address at least the above-mentioned problems and/or disadvantages and to provide at least the advantages described below. Accordingly, an aspect of the present invention is to provide an apparatus and method for selecting a mobile communication system in a portable terminal.

Another aspect of the present invention is to provide an apparatus and method for lowering power consumption and shortening a service acquisition time by detecting a region which provides only a WCDMA service and selecting a mobile communication system based on the detection when a portable terminal travels within the region which provides only the WCDMA service, not the GSM service.

Yet another aspect of the present invention is to provide an apparatus and method for automatically searching for both of the GSM and the WCDMA for a rapid service acquisition when a portable terminal moves from an area providing only the WCDMA service to an area providing the GSM service.

Still another aspect of the present invention is to provide an apparatus and method for automatically searching for the WCDMA when a portable terminal moves to an area providing only the WCDMA service, and searching for both of the GSM and the WCDMA when the portable terminal moves into an area supporting the GSM and the WCDMA even though a user doesn’t manually change a network mode.

The above aspects are achieved by providing a method for selecting a mobile communication system of a portable terminal. The method includes driving a first timer; checking whether a Mobile Country Code (MCC) of a region where the portable terminal is located is obtained by searching for a network until the first timer expires; when the MCC is obtained before the first timer expires, storing the obtained MCC to a previous MCC list; performing a first checking operation for checking whether the obtained MCC belongs to a list of countries supporting only a first mobile communication system; and obtaining a service of the first mobile communication system by searching for only the first mobile communication system when the obtained MCC belongs to the list of the countries supporting only the first mobile communication system.

According to one aspect of the present invention, a portable terminal for selecting a mobile communication system includes a controller for driving a first timer, checking whether an MCC of a region where the portable terminal is located is obtained by searching for a network until the first timer expires, storing an obtained MCC to a previous MCC list when the MCC is obtained before the first timer expires, performing a first checking operation for checking whether the obtained MCC belongs to a list of countries supporting only a first mobile communication system, and obtaining a service of the first mobile communication system by searching for only the first mobile communication system when the obtained MCC belongs to the list of the countries supporting only the first mobile communication system; and a storage for storing the previous MCC list, the list of the countries supporting only the first mobile communication system, and a program and data necessary for the operations of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, same reference numerals will be understood to refer to the same parts, components and structures.

DETAILED DESCRIPTION OF PREFERRED EMBODIMENTS

The following description with reference to the accompanying drawings is provided to assist in a comprehensive understanding of preferred embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A preferred embodiment of the present invention provides an apparatus and a method for selecting a mobile communication system in a portable terminal.

Figure 1:
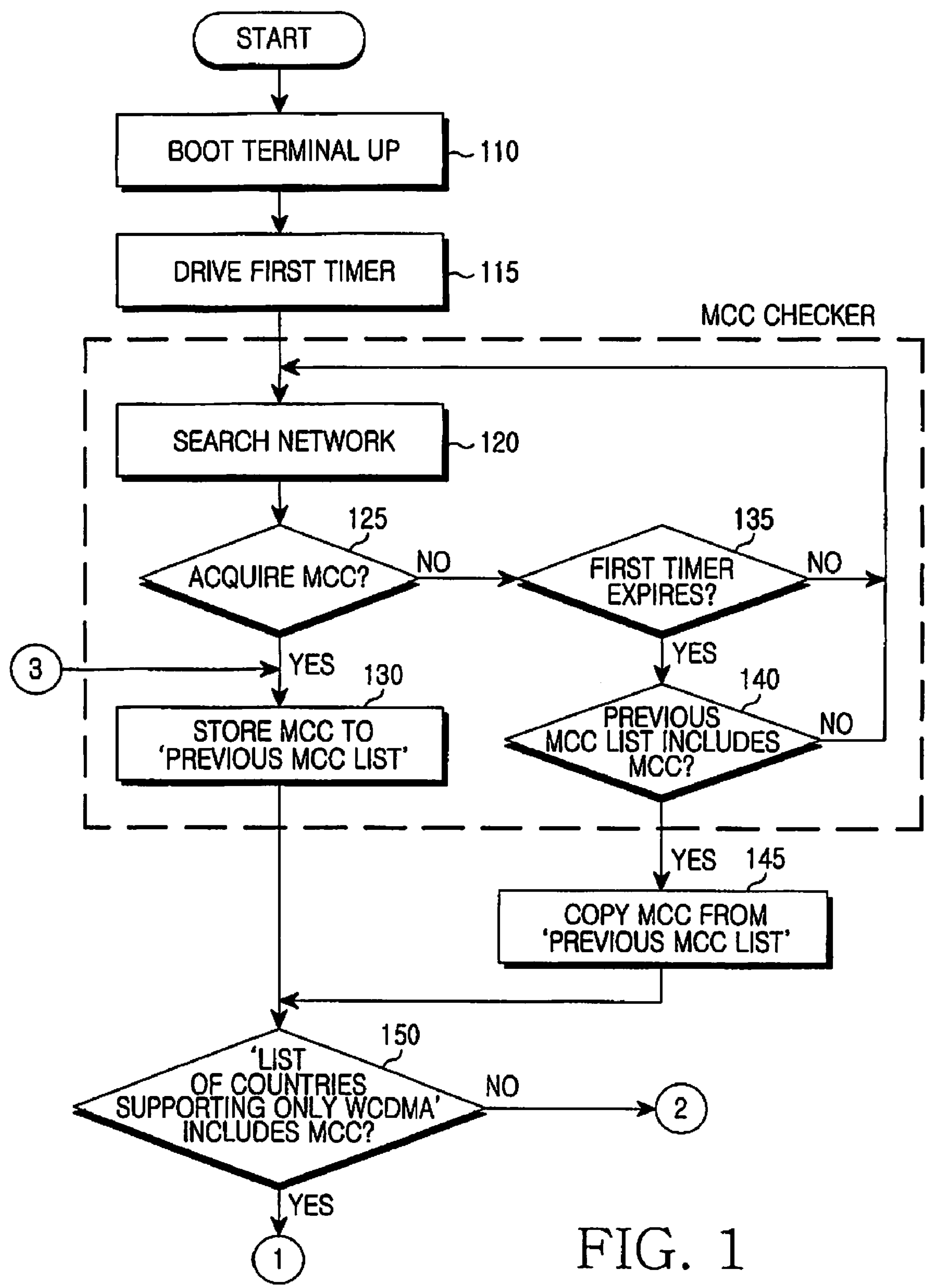
FIG. 1 is a flowchart outlining a network auto selection according to an preferred embodiment of the present invention.

FIG. 1 is a flowchart illustrating a network auto selection according to a preferred embodiment of the present invention.

When the portable terminal boots up in step 110, a controller, which will be described in more detail in connection with FIG. 5, of the portable terminal drives a first timer in step 115.

To detect its current location, the controller drives a Mobile Country Code (MCC) checker, which will be described in more detail in connection with FIG. 5. The MCC checker searches every connectable network in the current location regardless of the service acquisition in step 120, and obtains an MCC by receiving system information over the searched network.

Every provider in the same country broadcasts the system information including the same MCC regardless whether the network is a Global System for Mobile telecommunication (GSM) or a Wideband Code Division Multiple Access (WCDMA). Hence, the MCC checker needs to search for both the GSM service and the WCDMA service. It is possible to identify the country where the portable terminal travels at an initial boot-up through the MCC checker. When receiving one or more MCCs in step 125, the portable terminal stores the received MCC in a previous MCC list in step 130.

If the portable terminal is placed in the "No service" state at the initial boot-up, it cannot receive the MCC. In this case, to avoid the continuous search, the portable terminal stops the MCC checker if no MCC is received when the first timer expires in step 135. Next, when the previous MCC list includes a previous MCC in step 140, the portable terminal loads and utilizes the stored previous MCC in step 145.

When the portable terminal is manufactured in the "No service" state, there are no MCCs in the previous MCC list after the boot-up of the portable terminal in step 140. Thus, the portable terminal continues searching until it receives the MCC even though the first timer expires in steps 120, 125, 135 and 140. In the phase of the manufacture, the MCC can be stored in the previous MCC list by default.

The MCC checker receives and stores the MCC in step 130, and the controller checks whether the MCC belongs to a "list of countries supporting only WCDMA" in step 150.

Figure 2:
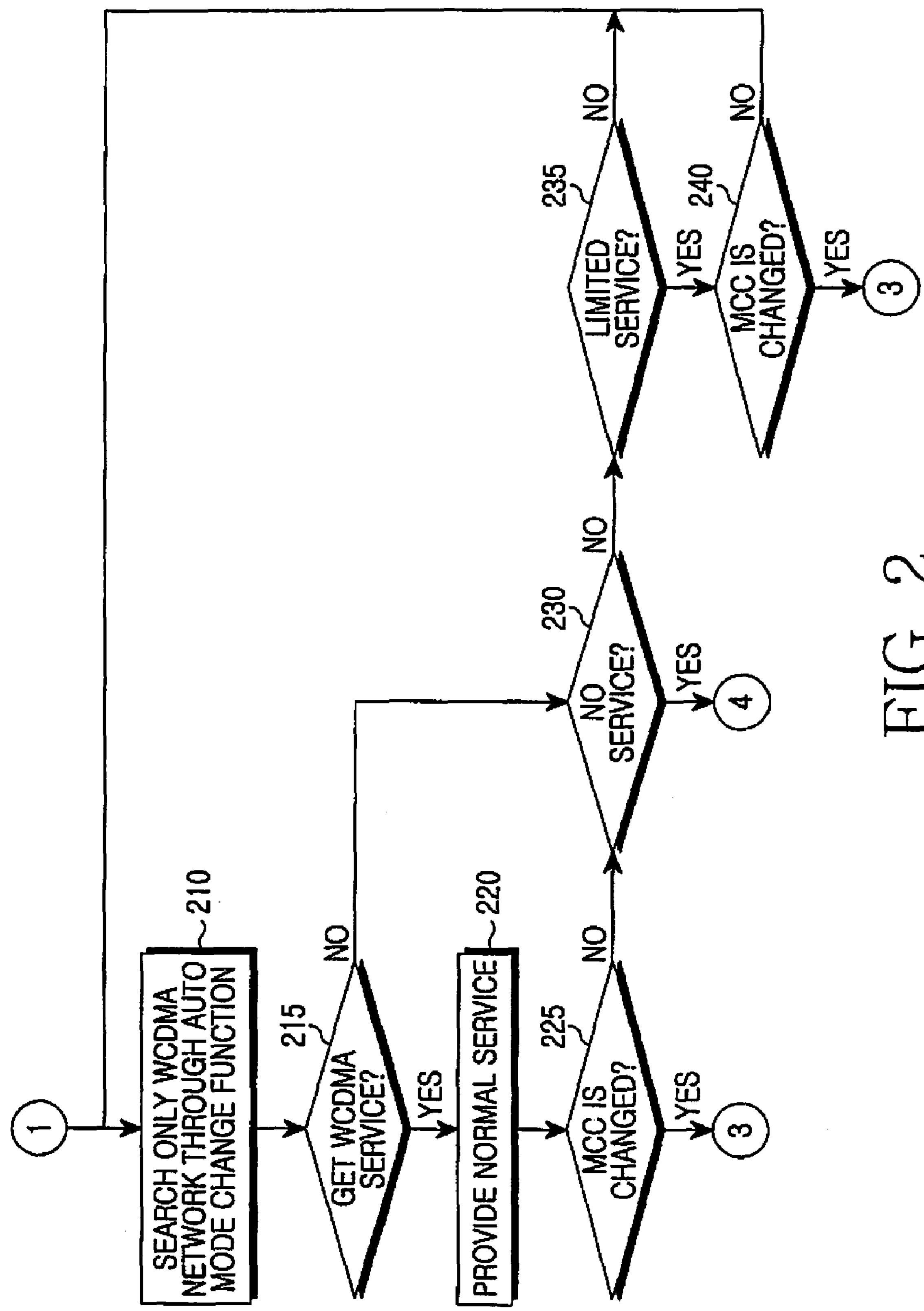
FIG. 2 is a flowchart outlining the network auto selection according to an preferred embodiment of the present invention.

When the MCC belongs to the "list of countries supporting only WCDMA" in step 150, the portable terminal operates as shown in FIG. 2.

Figure 4:
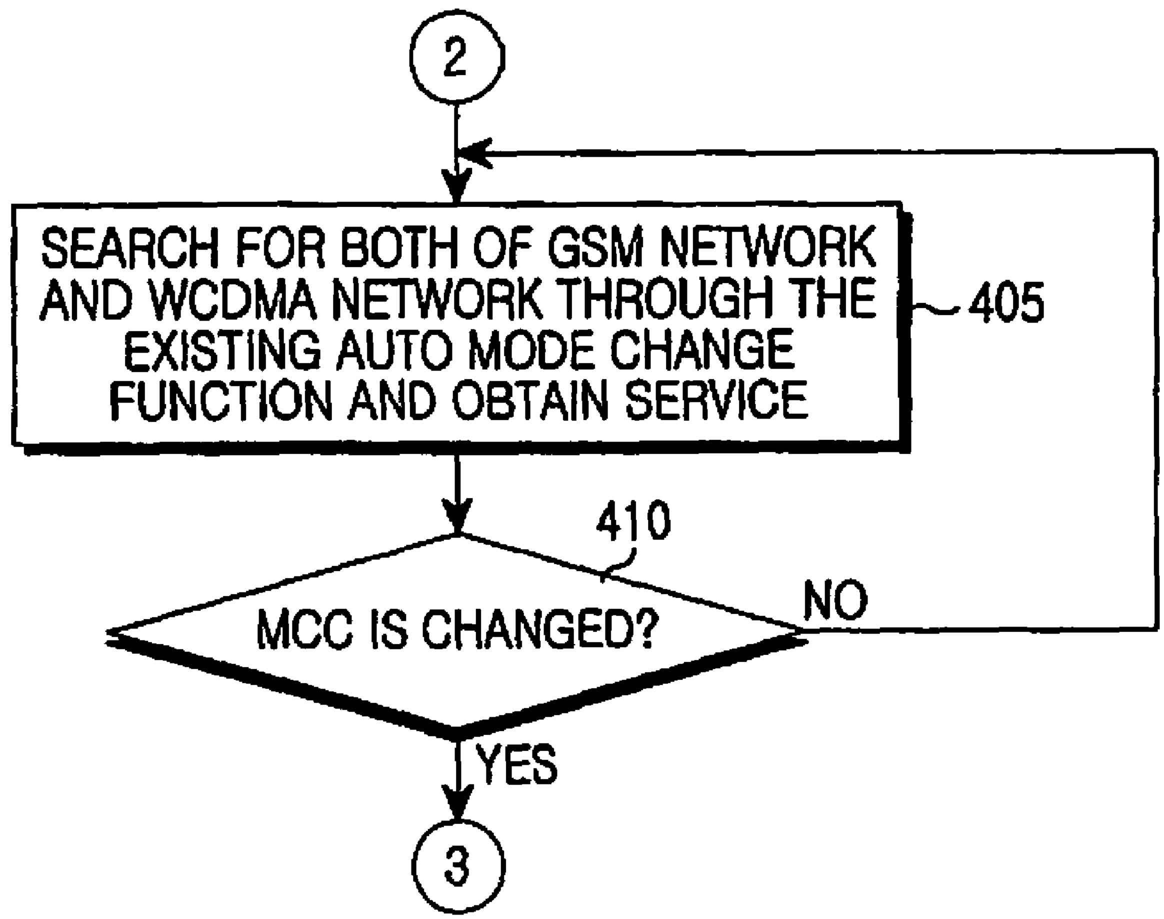
FIG. 4 is a flowchart outlining the network auto selection according to an preferred embodiment of the present invention.

When the MCC does not belong to the "list of countries supporting only WCDMA" in step 150, that is, when the MCC indicates a country servicing both the WCDMA and the GSM, the portable terminal operates as shown in FIG. 4.

FIG. 2 is a flowchart illustrating a network auto selection according to a preferred embodiment of the present invention.

When the MCC belongs to the "list of the countries supporting only WCDMA" in step 150 of FIG. 1, the controller (the same controller as in FIG. 1) controls an auto mode changer, which will be explained in more detail in connection with FIG. 5, to change the search mode to a WCDMA search mode and search for only the WCDMA network in step 210. Hence, without searching for the GSM, the intended service can be acquired fast.

Upon obtaining the WCDMA service in step 215, the controller can provide the normal service in step 220.

When the portable terminal moves, the controller checks whether the MCC of the area to which the portable terminal moved into is changed in step 225, whether the portable terminal enters the "No service" state in step 230, or whether the portable terminal enters the "Limited service" state in step 235.

By contrast, when not getting the WCDMA service in step 215, the controller checks whether the portable terminal enters the "No service" state in step 230, or whether the portable terminal enters the "Limited service" state in step 235.

When the MCC of the area to which the portable terminal moved is changed in step 225, the controller goes to step 130 of FIG. 1 and stores the changed MCC to the previous MCC list. That is, when receiving a new MCC, the controller resumes the steps after the MCC acquisition.

When the portable terminal does not enter the "No service" state in step 230 but the "Limited Service" state in step 235, even though the MCC can be identified, from the network by the portable terminal, the network service is not available. This is because every communication provider in one country broadcasts the same MCC.

Accordingly, in the "Limited service" state, the MCC can be identified. When the MCC is changed from the existing code in step 240, the controller stores the changed MCC to the previous MCC list in step 130 of FIG. 1 and conducts the subsequent operations. That is, when receiving a new MCC, the controller resumes the steps after the MCC acquisition.

Figure 3:
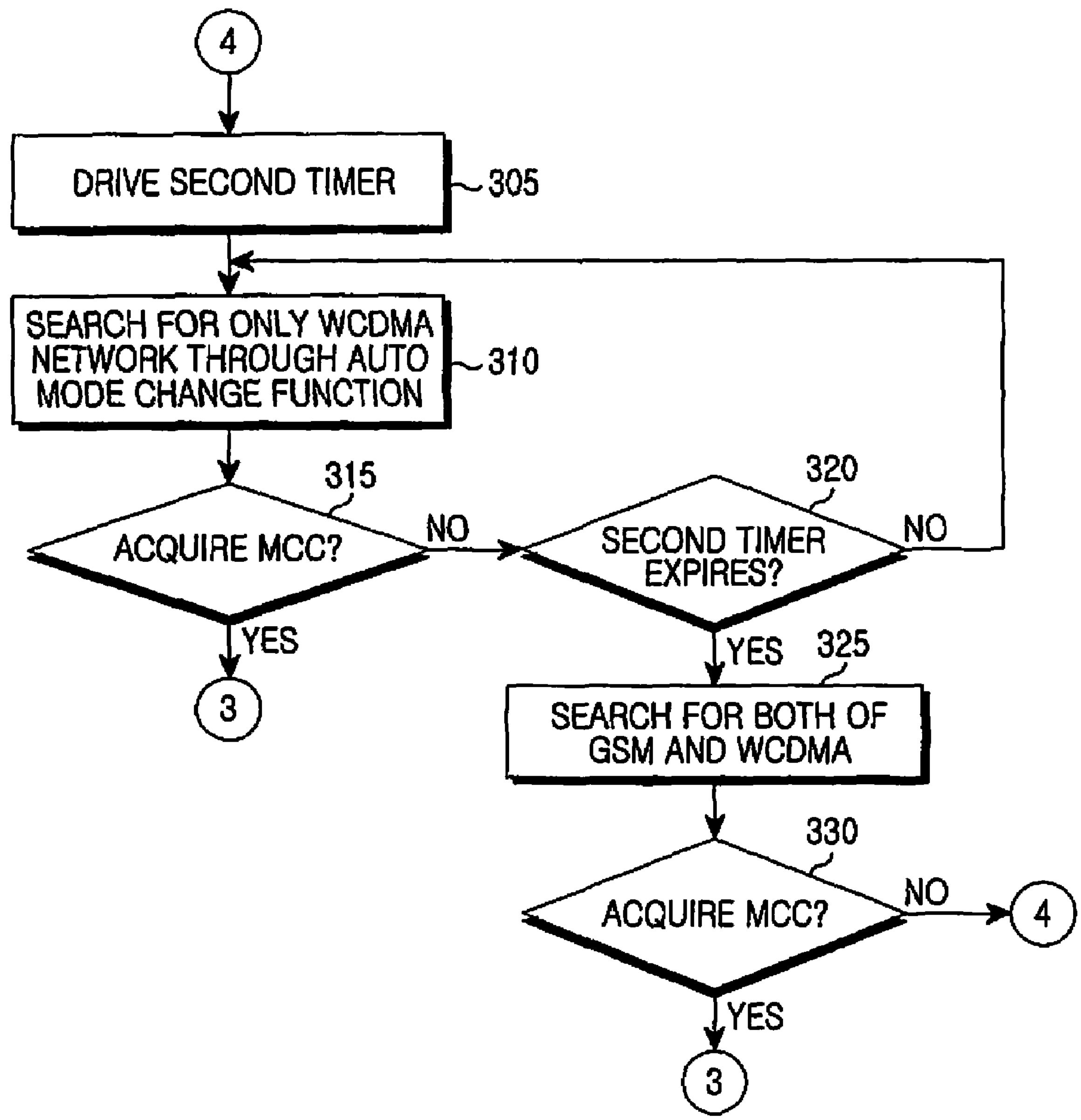
FIG. 3 is a flowchart outlining the network auto selection according to an preferred embodiment of the present invention.

When entering the "No service" state in step 230, the portable terminal operates as shown in FIG. 3.

FIG. 3 is a flowchart illustrating the network auto selection according to a preferred embodiment of the present invention.

When the portable terminal is under the "No service" state in step 230 of FIG. 2, the controller searches only for the WCDMA network because it is confirmed that the portable terminal travels within a country only provides the WCDMA service in the boot-up.

When the portable terminal moves to a country only provides the GSM service, the service acquisition is impossible. To avoid this, the controller (the same controller as in FIG. 1) drives a second timer in step 305 upon detecting the "No service" state.

In step 310, the controller controls the auto mode changer (the same auto mode changer as in FIG. 2) to only search for the WCDMA network.

When the MCC is obtained in the process of the search in step 315, the controller stores the MCC to the previous MCC list in step 130 of FIG. 1 and performs the subsequent steps. That is, when getting a new MCC, the controller resumes the steps after the MCC acquisition.

While the second timer operates, the controller continues searching only for the WCDMA network even though the MCC is not obtained.

When the second timer expires in step 320, the controller searches for both of the GSM network and the WCDMA network, similar to the existing auto mode change function, so as to check whether the portable terminal has moved into the country providing only the GSM service in step 325.

When not obtaining the MCC through the search for both of the GSM network and the WCDMA network in step 330, the controller returns to step 310 to drive the second timer and to control the auto mode changer to search only for the WCDMA network.

In particular, the controller searches only for the WCDMA network until the second timer expires, and for both of the GSM network and the WCDMA network when the second timer expires. If still not obtaining the MCC, the controller drives the second timer again and repeats the subsequent steps.

When acquiring the MCC by searching for both of the GSM network and the WCDMA network in step 330, the controller returns to step 130 of FIG. 1 to store the MCC to the previous MCC list and performs the subsequent steps. That is, as getting a new MCC, the controller resumes the steps after the MCC acquisition.

FIG. 4 is a flowchart illustrating the network auto selection according to a preferred embodiment of the present invention.

When the MCC does not belong to the "list of countries supporting only WCDMA" in step 150, the controller searches for both of the GSM network and the WCDMA network through the existing auto mode change function and thus obtains the service in step 405.

The controller (the same controller as in FIG. 1) continues to check whether the MCC is changed. When the MCC is changed, the controller returns to step 130 of FIG. 1 to store the changed MCC to the previous MCC list and performs the subsequent steps. That is, when getting a new MCC, the steps after the MCC acquisition are resumed.

Figure 5:
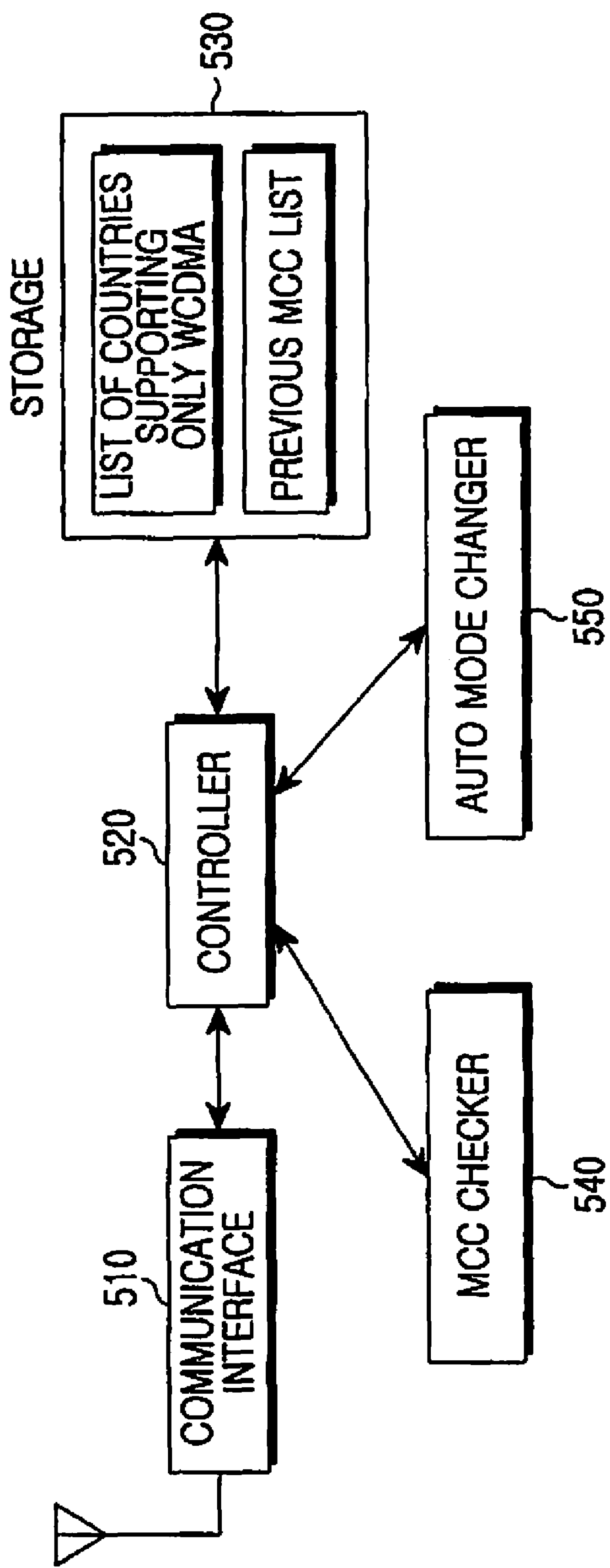
FIG. 5 is a block diagram of a portable terminal for the network auto selection according to an preferred embodiment of the present invention.

FIG. 5 is a block diagram of a portable terminal for the network auto selection according to a preferred embodiment of the present invention.

The portable terminal of FIG. 5 includes a communication interface 510, a controller 520, a storage 530, an MCC checker 540, and an auto mode changer 550.

The communication interface 510, which is a module for communicating with other nodes, includes a wireless processor and a baseband processor. The wireless processor converts a signal received in a radio path to a baseband signal and provides the baseband signal to the baseband processor. The wireless processor converts a baseband signal output from the baseband processor to a radio signal transmittable over the air and then transmits the radio signal via the antenna.

The controller 520 controls the operations of the portable terminal. The controller 520 controls the MCC checker 540 and the auto mode changer 550, and drives the first timer and the second timer.

Particularly, when the portable terminal services only the WCDMA, the controller 520 controls to search for only the WCDMA network. When the portable terminal provides both the GSM service and the WCDMA service, the controller 520 controls an automatically search for both of the GSM network and the WCDMA network.

The MCC checker 540 acquires the MCC of the country where the portable terminal boots up.

Under the control of the controller 520, the auto mode changer 550 searches for only the WCDMA network when the portable terminal is placed in the country allowing only the WCDMA. When the controller 520 directs to function as the previous auto mode changer, the auto mode changer 550 searches for both of the GSM and the WCDMA like the previous auto mode changer.

The storage 530 stores a program for controlling the operations of the terminal and temporary data generated in the program execution. Particularly, the storage 530 stores the "list of countries supporting only WCDMA" and the "previous MCC list". The "list of countries supporting only WCDMA" and the "previous MCC list" can be updated according to the operation of the controller 520, the MCC checker 540, and the auto mode changer 550.

As constructed above, the controller 520 is able to function as the MCC checker 540 and the auto mode changer 550. Herein, they are separately provided to distinguish their respective functions for clarity.

In the real implementation, the controller 520 may process all or part of the functions of the MCC checker 540 and the auto mode changer 550.

As set forth above, even when the user does not manually change the network mode, the portable terminal automatically searches for the WCDMA when moves into an area providing only the WCDMA service, and searches for both of the GSM and the WCDMA when moving into an area supporting the GSM and the WCDMA services. Therefore, the user's convenience is increased and the power consumption of the portable terminal is reduced.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method for selecting a mobile communication system of a portable terminal comprising:

driving a first timer;

checking whether a Mobile Country Code (MCC) of a region where the portable terminal is located is obtained by searching for a network until the first timer expires;

when the MCC is obtained before the first timer expires, storing the obtained MCC to a previous MCC list;

performing a first checking operation for checking whether the obtained MCC belongs to a list of countries supporting only a first mobile communication system; and obtaining a service of the first mobile communication system by searching for only the first mobile communication system when the obtained MCC belongs to the list of the countries supporting only the first mobile communication system.

2. The method of claim 1, further comprising:

when the MCC is not obtained until the first timer expires, obtaining an MCC from the previous MCC list; and performing the first checking operation for checking whether the MCC obtained from the previous MCC list belongs to the list of the countries supporting only the first communication system.

3. The method of claim 1, further comprising:

when the obtained MCC does not belong to the list of the countries supporting only the first mobile communication system, obtaining a service by searching for both of the first mobile communication system and a second mobile communication system;

performing a second checking operation for checking whether an MCC code is changed during the services acquired by searching for both of the first communication system and the second mobile communication system; and when the MCC is changed in the second checking operation, performing the first checking operation.

4. The method of claim 3, wherein the second mobile communication system is a Global System for Mobile telecommunication (GSM) mobile communication system.

5. The method of claim 1, further comprising:

after obtaining the service of the first mobile communication system by searching for only the first mobile communication system, providing the service of the first mobile communication system;

when the MCC is changed in the service of the first mobile communication system, performing the first checking operation; and when the portable terminal is in a limited service state and the MCC is changed in the service of the first mobile communication system, performing the first checking operation.

6. The method of claim 5, further comprising:

when the portable terminal is in a no service state during the service of the first mobile communication system, driving a second timer and performing a third checking operation for checking whether an MCC is received by searching for only the first mobile communication system;

when the MCC is received before the second timer expires, performing the first checking operation;

when the MCC is not received until the second timer expires, checking whether an MCC is obtained by searching for both of the first mobile communication system and the second mobile communication system;

when the MCC is obtained by searching for both of the first mobile communication system and the second mobile communication system, performing the first checking operation; and when the MCC is not obtained by searching for both of the first mobile communication system and the second mobile communication system, performing the third checking operation.

7. The method of claim 1, wherein the first mobile communication system is a Wideband Code Division Multiple Access (WCDMA) mobile communication system.

8. A portable terminal for selecting a mobile communication system comprising:

a controller for driving a first timer, checking whether a Mobile Country Code (MCC) of a region where the portable terminal is located is obtained by searching for a network until the first timer expires, storing an obtained MCC to a previous MCC list when the MCC is obtained before the first timer expires, performing a first checking operation for checking whether the obtained MCC belongs to a list of countries supporting only a first mobile communication system, and obtaining a service of the first mobile communication system by searching for only the first mobile communication system when the obtained MCC belongs to the list of the countries supporting only the first mobile communication system; and a storage for storing the previous MCC list, the list of the countries supporting only the first mobile communication system, and a program and data necessary for the operations of the controller.

9. The portable terminal of claim 8, wherein, when the MCC is not obtained until the first timer expires, the controller obtains an MCC from the previous MCC list and performs the first checking operation for checking whether the MCC obtained from the previous MCC list belongs to the list of the countries supporting only the first communication system.

10. The portable terminal of claim 8, wherein, when the obtained MCC does not belong to the list of the countries supporting only the first mobile communication system, the controller obtains a service by searching for both of the first mobile communication system and a second mobile communication system, performs a second checking operation for checking whether an MCC code is changed during the services acquired by searching for both of the first communication system and the second mobile communication system, and performs the first checking operation when the MCC is changed in the second checking operation.

11. The portable terminal of claim 10, wherein the second mobile communication system is a Global System for Mobile telecommunication (GSM) mobile communication system.

12. The portable terminal of claim 8, wherein the controller provides the service of the first mobile communication system after obtaining the service of the first mobile communication system by searching for only the first mobile communication system, performs the first checking operation when the MCC is changed in the process of the service of the first mobile communication system, and performs the first checking operation when the portable terminal is in a limited service state and the MCC is changed in the process of the service of the first mobile communication system.

13. The portable terminal of claim 12, wherein the controller, in the no service state during the service of the first mobile communication system, drives a second timer and performs a third checking operation for checking whether an MCC is received by searching for only the first mobile communication system, performs the first checking operation when the MCC is received before the second timer expires, checking whether an MCC is obtained by searching for both of the first mobile communication system and the second mobile communication system when the MCC is not received until the second timer expires, performs the first checking operation when the MCC is obtained by searching for both of the first mobile communication system and the second mobile communication system, and performs the third checking operation when the MCC is not obtained by searching for both of the first mobile communication system and the second mobile communication system.

14. The portable terminal of claim 8, wherein the first mobile communication system is a Wideband Code Division Multiple Access (WCDMA) mobile communication system.

* * * * *